(12) United States Patent
Blangé et al.

(10) Patent No.: US 8,271,828 B2
(45) Date of Patent: Sep. 18, 2012

(54) RESTARTING NETWORKS

(75) Inventors: Marinus Johannes Blangé, Nootdorp (NL); Miodrag Djurica, Rotterdam (NL)

(73) Assignee: Nederlandse Organisatie voor toegepast-natuurwetenschappelijk Onderzoek TNO, Delft (NL)

( * ) Notice: Subject to any disclaimer, the term of this patent is extended or adjusted under 35 U.S.C. 154(b) by 65 days.

(21) Appl. No.: 12/671,386

(22) PCT Filed: Jul. 30, 2008

(86) PCT No.: PCT/NL2008/050520
§ 371 (c)(1),
(2), (4) Date: Apr. 16, 2010

(87) PCT Pub. No.: WO2009/017407
PCT Pub. Date: Feb. 5, 2009

(65) Prior Publication Data
US 2010/0205480 A1 Aug. 12, 2010

(30) Foreign Application Priority Data
Jul. 30, 2007 (EP) .................................. 07113387

(51) Int. Cl.
*G06F 11/00* (2006.01)
(52) U.S. Cl. .......................... 714/4.1; 709/223; 709/224
(58) Field of Classification Search ................... 714/4.1
See application file for complete search history.

(56) References Cited

U.S. PATENT DOCUMENTS

| | | | |
|---|---|---|---|
| 6,070,192 A * | 5/2000 | Holt et al. ...................... | 709/227 |
| 6,675,295 B1 | 1/2004 | Marcelais et al. | |
| 6,701,463 B1 | 3/2004 | Toeller | |
| 6,928,579 B2 * | 8/2005 | Aija et al. ..................... | 714/6.11 |
| 7,010,718 B2 * | 3/2006 | Ogawa et al. .................. | 714/4.3 |
| 7,188,220 B2 * | 3/2007 | Spiegel ......................... | 711/155 |
| 7,197,670 B2 * | 3/2007 | Boatright et al. ............... | 714/42 |
| 7,302,608 B1 * | 11/2007 | Acharya et al. ................. | 714/13 |
| 7,356,729 B2 * | 4/2008 | Lennert et al. ................. | 714/6.3 |
| 7,421,621 B1 * | 9/2008 | Zambrana .................. | 714/38.14 |

(Continued)

FOREIGN PATENT DOCUMENTS

EP 1 326 375 A 7/2003

(Continued)

OTHER PUBLICATIONS

International Search Report for PCT/NL2008/050520, dated Jan. 22, 2009.

*Primary Examiner* — Kamini Patel
(74) *Attorney, Agent, or Firm* — Leydig, Voit & Mayer, Ltd.

(57) ABSTRACT

A method of restarting a network (1) consisting of network modules (2), the method comprising the steps of: * recording error data associated with errors occurring in the network, the error data including sets of network variables applying when the errors occurred, * upon detection of a start-up error, deriving a new set of network variables from the recorded error data, for example by changing the order of two network variables, and * restarting the network while using the new set of network variables. The network modules (2) may be wireless modules, while the network variables may comprise communication channel numbers or network addresses. The method may be carried out using a network control device (4) coupled to a central network unit (3).

23 Claims, 1 Drawing Sheet

U.S. PATENT DOCUMENTS

| | | | |
|---|---|---|---|
| 7,805,707 B2 * | 9/2010 | Pouliot | 717/124 |
| 7,827,446 B2 * | 11/2010 | Kimura et al. | 714/43 |
| 7,840,835 B2 * | 11/2010 | Hatasaki et al. | 714/4.1 |
| 7,895,320 B1 * | 2/2011 | Oggerino et al. | 709/224 |
| 2003/0093709 A1 * | 5/2003 | Ogawa et al. | 714/4 |
| 2005/0160326 A1 * | 7/2005 | Boatright et al. | 714/47 |
| 2005/0188092 A1 * | 8/2005 | Short et al. | 709/227 |
| 2005/0278583 A1 * | 12/2005 | Lennert et al. | 714/43 |
| 2007/0156951 A1 | 7/2007 | Sultan et al. | |
| 2007/0258369 A1 * | 11/2007 | Yamashima et al. | 370/230 |
| 2009/0136206 A1 * | 5/2009 | Aisu et al. | 386/83 |
| 2009/0177913 A1 * | 7/2009 | Quinn et al. | 714/4 |
| 2009/0217079 A1 * | 8/2009 | Liu et al. | 714/4 |
| 2010/0115341 A1 * | 5/2010 | Baker et al. | 714/37 |

FOREIGN PATENT DOCUMENTS

| | | |
|---|---|---|
| JP | 1010366 A | 1/1989 |

* cited by examiner

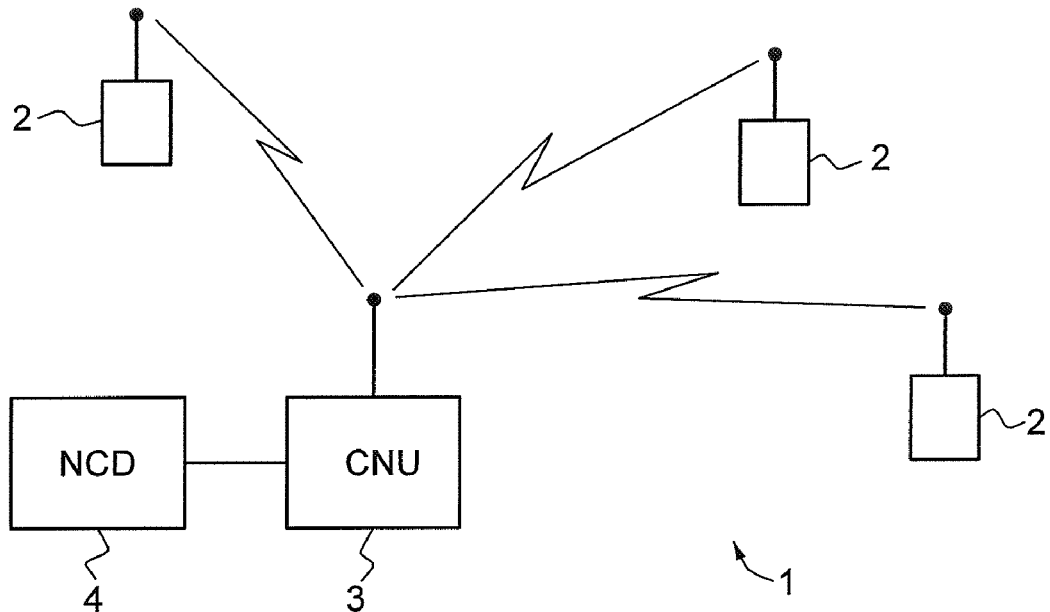
FIG. 1
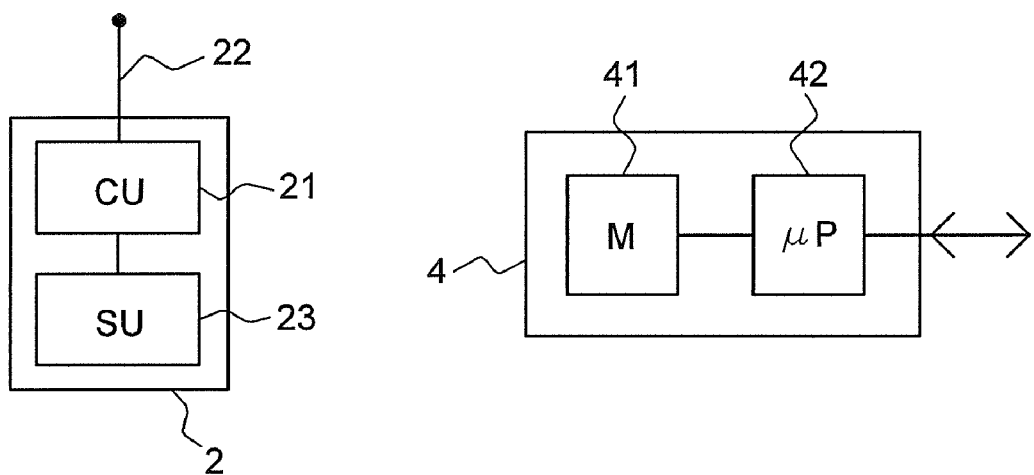
FIG. 2
FIG. 3

RESTARTING NETWORKS

FIELD OF THE INVENTION

The present invention relates to restarting networks. More in particular, the present invention relates to a device for controlling a network comprising network modules, and to a method of restarting a network comprising network modules.

BACKGROUND

Networks consisting of modules capable of communicating with each other and/or with a central network unit are well known. Communication between the network modules may take place via cables, wireless (e.g. radio frequency) links, or both. The network modules may be computers or other devices and are, in general, capable of processing information and of transmitting and/or receiving information.

Increasingly, sensor networks are used for the surveillance of dams, dykes, buildings, bridges, ships and other structures, and for measuring properties of such structures. In sensor networks, the network modules contain sensors which produce measurement data. These data are transmitted via the network to a central network unit for processing or for further transmission to a remote processing unit.

For a network to be operational, it has to be started up: communication with the network modules must be established in accordance with a certain network protocol. At start-up, network modules are typically assigned communication channels and/or time slots, and the various network modules may be probed in a certain order. However, this start-up process may fail, as a result of which the network will not be able to function properly, or may not function at all.

After a start-up failure, a network may be restarted. However, the problem that caused the initial start-up to fail may still be present and cause the restart to fail too. As a result, the network may be restarted several times without success. The prior art fails to provide an adequate solution for this problem.

Japanese Patent Application JP 64-10366 (NEC) discloses a system for reconfiguring a network. The network configuration information is revised when network elements are added to or deleted from the network. Network revision information is stored in a revision history file. When restarting the network after an addition/revision request, revision information is read from the network revision history file to revise the network constitution information. Although this known system is useful when altering the configuration of a network, for example by adding or deleting network modules, it offers no solution for start-up problems. In this known system, start-up failures will not influence the contents of the revision history file and hence the network will attempt to restart in the same manner, unless an external revision request is received. However, these revision requests are unrelated to start-up failures and will therefore not solve any start-up problems.

SUMMARY OF THE INVENTION

It is an object of the present invention to overcome these and other problems of the Prior Art and to provide a device for controlling a network, as well as a method of starting up a network, which significantly increase the probability of successful restarts of the network.

Accordingly, the present invention provides a device for controlling a network comprising network modules, the device comprising:

- a memory unit for recording error data associated with errors occurring in the network, the error data comprising sets of network variables applying when the respective errors occurred,
- a processing unit for detecting a start-up error and for deriving a new set of network variables from the recorded error data, wherein the processing unit is arranged for restarting the network while using the new set of network variables.

By providing a memory unit for recording error data, a log of error data is compiled, preferably for each error occurring in the network. The error data include sets of network variables, each set corresponding to the current network variables at the time the error occurred. Compiling a history of network variables, and hence of the network status, allows a comparison of the network status under various fault conditions and makes it possible to reduce the likelihood of the occurrence of a new error.

By providing a new (that is, revised) set of network variables, the network will be restarted using a set of variables which differs from the set of the previous start-up. The different or altered network variables significantly reduce the chance that a start-up error occurs again. If the same start-up error occurs again, the recorded error data provide an indication of the possible cause.

It is noted that JP 64-10366 mentioned above compiles a revision history representing the changes made to the network configuration, while the present invention compiles an error history representing the errors and the network variables at the moment the errors occurred. The present invention automatically changes network variables, such as the start-up order of the network elements, when a fault has occurred, but does not change the actual network configuration.

The network variables may comprise network settings, such as channel numbers and network module numbers. More in particular, the network variables (in a file of network variables) may determine the order in which, for example, network modules are activated, at which points in time they are activated and/or how channel numbers are assigned. Accordingly, the processing unit of the device according to the present invention may be arranged for changing the order of at least two network variables. Additionally, or alternatively, the processing unit may be arranged for excluding at least one combination of network variables, and/or be arranged for altering the values of network variables.

The error data ("error log") recorded in the memory may include both start-up error data and run-time error data. As run-time error data are typically not relevant for detecting the cause of start-up errors, the processing unit may advantageously be arranged for excluding error data associated with run-time errors and for only taking start-up errors into account. In other embodiments, however, the error data recorded in the memory may only consist of start-up errors and their associated network variables, thus eliminating the need to exclude certain error data.

In addition to network variables, the error data may comprise resource data indicating which resources (that is, network elements) were involved in each respective error, and/or general data, such as time stamps and error types.

The start-up errors and their associated network variables may be determined in various ways. It is preferred that the processing unit is arranged for deriving error data from error messages. That is, error messages produced by network modules or other network elements are used to determine which (type of) error occurred. The network variables which were valid at the moment the error occurred may also be derived from the error message, or may be derived from other sources, such as tables in the memory of the control device, which tables represent the network variables currently applying in the network.

The processing unit may be arranged for limiting the number of restart attempts to a maximum number, said maximum number preferably being predetermined. This prevents the restarts to go on indefinitely, which may for example result in the exhaustion of batteries in battery-powered network modules.

The processing unit may further be arranged for carrying out a restart if the network modules fail to enter a desired state within a certain time duration, said time duration preferably being predetermined. The desired state may be a fully operational state or another, preferably predetermined state.

The present invention also provides a network comprising a device as defined above. The network may be arranged for taking measurements and transmitting measured values to a central unit, the network modules each comprising a sensor unit and a communications unit. Alternatively, the network may be a communication network having wireless and/or wired links. The network modules may be wireless modules, and the network variables preferably comprise network addresses and/or communication channel numbers.

The present invention further provides a method of restarting a network comprising network modules, the method comprising the steps of:
 recording error data associated with errors occurring in the network, the error data comprising sets of network variables occurring when the respective errors occurred,
 upon detection of a start-up error, deriving a new set of network variables from the recorded error data, and
 restarting the network while using the new set of network variables.

The step of deriving a new or revised set of network variables may comprise the sub-steps of changing the order of at least two network variables, the sub-step of excluding at least one combination of network variables and/or the sub-step of altering the values of network variables.

The step of deriving a new set of network variables may comprise the sub-step of excluding error data associated with run-time errors. The step of recording error data may involve deriving error data from error messages. Alternatively, or additionally, the step of deriving a new set of network variables may comprise the sub-step of altering the values of network variables.

In a preferred embodiment, the step of recording error data involves deriving error data from error messages. Although wired connections may be used, the network modules are preferably wireless modules, the network variables more preferably comprising network addresses and/or communication channel numbers.

Further embodiments of the method according to the present invention will become apparent from the description of the preferred embodiments below.

The present invention additionally provides a computer program product for carrying out the method as defined above. A computer program product may comprise a set of computer executable instructions stored on a data carrier, such as a CD or a DVD. The set of computer executable instructions, which allow a programmable computer to carry out the method as defined above, may also be available for downloading from a remote server, for example via the Internet.

BRIEF DESCRIPTION OF THE DRAWINGS

The present invention will further be explained below with reference to exemplary embodiments illustrated in the accompanying drawings, in which:

FIG. 1 schematically shows an exemplary embodiment of a network according to the present invention.

FIG. 2 schematically shows an exemplary embodiment of a network module used in the network of FIG. 1.

FIG. 3 schematically shows an exemplary embodiment of a network control device according to the present invention.

DETAILED DESCRIPTION OF THE DRAWINGS

The network 1 shown merely by way of non-limiting example in FIG. 1 comprises a number of network modules 2 and a central network unit (CNU) 3. The central network unit 3 is coupled to a network control device (NCD) 4. In the exemplary embodiment of FIG. 1, the network control device 4 is shown as a separate unit. However, in other embodiments this control device 4 may be part of the central network unit 3. Similarly, the network modules 2 are shown to be wireless modules capable of wirelessly communicating with the central network unit 3, but in other embodiments there may be wired links between the network modules 2 and the central network unit 3.

Although the network modules 2 are shown to be single modules, each network module may be constituted by a sub-network, for example a hierarchical sub-network. The present invention may also be used in networks without a central network unit. In those networks, the network control device 4 may be coupled to one of the network modules.

For the network to become operational it has to be started up. This involves activating and establishing communications between the central network unit 3 and the network modules 2. Initially, the network modules are switched on manually and may be in stand-by mode. In a typical embodiment, the central network unit 3, once activated, may send activation messages to the network modules 2, upon which the network modules activate their various components (for example sensor units). When the activation is successful, the network modules may send messages to the central network unit to indicate that they are ready. The central network unit may then reply by sending messages allocating time slots and/or communication channels (frequencies) to the various network modules. When all network modules have acknowledged the receipt of those allocation messages, the network is ready for use.

However, not all elements of the network may work properly. Some network modules may not respond to the messages sent by the central network unit, for example because those modules are faulty, have an expired battery, or are beyond the range of the transmitter of the central network unit 3. As a result, the response from the network modules concerned will never be received. Typically, this will be detected by the central network unit after a certain time period has expired. The central network unit may then carry out a restart.

More in particular, the restart mechanism may be activated by a failure which is captured by a software program, executed by the processor of the central network unit. This failure or error may be captured by a time-out (that is, the expiry of a time period) or by the receipt of an error message. A time-out may be caused by a failure to receive data from a network element.

Typical prior art networks will continue restarting until a successful start-up takes place. The network variables defining the start-up procedure, for example the order in which the network modules are polled, will be the same in each start-up attempt. As a result, failures due to certain network variable settings will be repeated and a successful start-up will not take place.

The present invention solves this problem by "learning" from previous start-up failures to improve new start-up attempts. More in particular, the present invention proposes to record error data associated with errors occurring in the network, the error data including sets of network variables. Upon detection of a start-up error, a new set of network variables is derived from the recorded error data. Then the network is restarted using the new set of network variables.

The record of error data used in a preferred embodiment of the present invention may be referred to as a restart history table, each restart being the result of an error occurring in the network. The error data recorded in the table comprise sets of network variables applying when the respective errors occurred. In the non-limiting example of Table 1, three main categories of error data are distinguished: General Data, Resources and Network Variables.

The General Data category includes the columns Time Stamp, Status Indication (SI) and Message Identifier (MeI). The Status Indication can either be SF (Start-up Fault) or OF (Operation Fault), the latter type of fault occurring during operation of the network after a successful start-up. The Message Identifier indicates the type of message received. Message types may be categorised on the basis of the layer involved, for example the physical layer, the medium access control layer and the network layer. Other message categories are also possible.

The Resources category includes the columns Channel number and Message Network Element (MeNE) and represents the network resources (that is, the network elements) involved in the error. The Channel number indicates the communication channel involved, while the Message Network Element represents the network element from which the particular error message originated.

The Network Variables category includes the columns Channel Order, Network Element Order (NE Order) and Forbidden Combination. The Channel Order column and the Network Element Order column represent the order in which the communication channels and the network elements are activated respectively, while the Forbidden Combination column indicates if any combinations of network variables are excluded, for example because they are known to introduce errors.

changed: the order of channels has been changed from " . . . , #12, #13, #14, #15" into " . . . , #12, #14, #15, #13". In other words, channel #13 has been moved to the last position of the channels to be activated. This change in channel order may cause the network to start up correctly.

When creating a new set of network variables from previous sets, the rows pertaining to operation faults (OF in the Status Indication column) are ignored in the preferred embodiments of the invention, as operation faults (also known as run-time errors) are typically not indicative of start-up errors.

New sets of network variables can be created by changing the order of variables and/or excluding certain combinations of variables. When changing the order of variables, an order occurring in the previous rows is avoided. Instead of, or in addition to changing the order of the previously used variables, new variables may replace previously used variables.

Sometimes it can be determined from the restart history table that certain network resources are faulty, for example when such resources repeatedly fail to connect to the network. In a new set of network variables, these faulty resources can be excluded by deleting the corresponding network variable. For example, if it is concluded that network element number 0x0056 is faulty, then the corresponding number is not included in the new set of network variables (column NE Order).

If the likely cause of a start-up failure can be determined, the value of the associated network variable is changed, if this is feasible. If changing the values of currently used network variables fails to provide a successful start-up, additional network variables may be used. That is, the set of network variables may be expanded if necessary. As mentioned above, the set of network variables may also be reduced, for example by excluding certain network elements.

To determine the most likely cause of a start-up failure, a number of rows may be compared, counting the matching network parameters (general data, resources and/or network variables). In particular resources common to several rows (that is, several start-up errors) should be excluded or their parameters (that is, network variables) should be changed.

In one embodiment, the fault causes of the most recent set of start-up-related error data (that is, of the last start-up fail-

TABLE 1

Restart history table

| General Data | | | Resources | | Network Variables | | |
|---|---|---|---|---|---|---|---|
| Time Stamp | SI | MeI | Ch. | MeNE | Channel Order | NE Order | Forb. Comb. |
| 13:01:25 | SF | 1 | #13 | 0x0056 | #1 . . . #15 | 0x0001 . . . 0x00FF | none |
| 13:02:10 | SF | 1 | #13 | 0x0034 | #1 . . . #15 | 0x0001 . . . 0x0055, 0x0057 . . . 0x00FF, 0x0056 | none |
| 13:25:11 | OF | 1 | #14 | 0x0026 | #1...#15 | 0x0001 . . . 0x0055, 0x0057 . . . 0x00FF, 0x0056 | none |
| | | | | | #1 . . . #12, #14, #15, #13 | 0x0001 . . . 0x0055, 0x0057 . . . 0x00FF, 0x0056 | none |

Each row of Table 1 represents the status of the network at the moment the fault occurred. According to the present invention, one or more rows representing past errors are used to produce a new set of variables and/or resources. That is, a new row is created from previous rows, changing at least one item. In the example of Table 1, the channel order has been ure) are used as a starting point for determining the new, revised set of network variables. The resource of the most recent set that has the highest number of matches with the other sets of error data is selected as the possible fault cause and the network variable associated with this resource is changed.

As a fault cause consisting of a small number of parameter combinations is likely to have more matches than a fault cause consisting of a relatively large number of parameters, a weighing factor may be applied to compensate this difference in likelihood.

It is noted that in the preferred embodiments of the present invention, the message type column (MeI) is not used for determining a new set of network variables and for this reason, this column may be deleted. However, in some embodiments this column may be used to derive or verify information.

Although all previous rows may be taken into consideration when creating a new set of network variables, in some embodiments only a limited number of previous rows is used, for example only the last five or the last ten or twenty rows. Alternatively, or additionally, older rows may be deleted so as to use only relatively recent data. For this reason, rows may be provided with a time stamp. In addition, older rows or the entire history may be deleted when a network configuration change is carried out. For the avoidance of doubt, it is observed that in the present invention the network configuration is not determined by the new set of network variables.

When even the present invention fails to effect a successful restart of the network, the restart attempts may be abandoned. For this reason, a limit may be imposed on the number of restart attempts, for example 20, 50 or 100 attempts. An alarm signal may be generated when this number is reached.

A merely exemplary embodiment of a network module 2 is schematically illustrated in FIG. 2. The network module 2 is shown to comprise a communication unit 21, an antenna 22 and a sensor unit 23. The antenna 21 and the sensor unit 23 are coupled to the communication unit 22 to allow sensor data to be transmitted to the central network unit (3 in FIG. 1). The sensor unit 23 may comprise, for example, a temperature sensor, a humidity sensor, an acceleration sensor and/or a pressure sensor. The communication unit 21 shown is arranged for wireless communication using radio frequency (RF) transmission or, in some embodiments, infra-red transmission. Instead of, or in addition to wireless transmission, the communication unit 21 may be arranged for wired transmission techniques.

In accordance with the present invention, the communication unit 21 is also arranged for producing error messages when errors occur, in particular start-up errors. Upon detection of an error, the communication unit 21 transmits a corresponding error message to the central network unit. The error message may include the type of error, the point in time at which the error occurred and/or at which the error message was transmitted.

An embodiment of a network control device 4 is illustrated in FIG. 3. The merely exemplary embodiment shown in FIG. 3 comprises a memory (M) 41 and a microprocessor (μP) 42. The memory 41 stores error messages and network parameters (including network variables), while the microprocessor 42 processes network parameters derived from the error messages so as to derive a new set of network parameters.

The present invention is particularly useful when applied in a sensor network, for example a sensor network for monitoring dykes, bridges and similar structures.

The present invention is based upon the insight that a network can improve its ability to restart if it learns from its previous restart attempts. The present invention benefits from the further insight that a history of network values valid during previous restart attempts can be used to produce a new set of network values having an improved chance of succeeding in restarting the network.

It is noted that any terms used in this document should not be construed so as to limit the scope of the present invention. In particular, the words "comprise(s)" and "comprising" are not meant to exclude any elements not specifically stated. Single (circuit) elements may be substituted with multiple (circuit) elements or with their equivalents.

It will be understood by those skilled in the art that the present invention is not limited to the embodiments illustrated above and that many modifications and additions may be made without departing from the scope of the invention as defined in the appending claims.

The invention claimed is:

1. A device for controlling a network comprising network modules, the device comprising:
   a memory unit for recording error data associated with errors occurring in the network, the error data comprising sets of network variable settings applying when the respective errors occurred, the network variable settings defining at least one of the set consisting of:
   a start-up order of network elements, and
   an order of activating communication channels allocated to the network modules; and
   a processing unit for detecting a start-up error and for deriving a new set of network variable settings from the recorded error data, by changing at least one of the start-up order of network elements and the order of activating communication channels allocated to the network modules,
   wherein the processing unit is arranged for restarting the network while using the new set of network variable settings.

2. The device according to claim 1, wherein the processing unit is arranged for excluding at least one combination of network variable settings.

3. The device according to claim 1, wherein the processing unit is arranged for altering values of network variables.

4. The device according to claim 1, wherein the processing unit is arranged for excluding error data associated with run-time errors.

5. The device according to claim 1, wherein the processing unit is arranged for deriving error data from error messages.

6. The device according to claim 1, wherein the processing unit is arranged for limiting a number of restart attempts to a maximum number.

7. The device according to claim 1, wherein the processing unit is arranged for carrying out a restart if the network modules fail to enter a desired state within a certain time duration.

8. The device according to claim 1, wherein the processing unit is configured to compare recorded error data for a plurality of start up errors, determining parts of the network parameters that are common to the recorded error data for several start up errors and change said parts to derive the new set of network variables.

9. The device according to claim 1, wherein the start-up order of network elements comprises an order of polling the network modules.

10. The device according to claim 1, wherein the recorded error data comprises a channel order representing the order in which the communication channels are activated, and a network element order representing the order in which the network modules are activated.

11. A network, comprising a device according to claim 1.

12. The network according to claim 11, wherein the network modules are wireless modules, and the network variables comprise at least one of the set of network variables including: network addresses and communication channel numbers.

13. A method of restarting a network comprising network modules, the method comprising the steps of:
   recording error data associated with errors occurring in the network, the error data comprising sets of network variable settings applying when the respective errors occurred, the network variable settings defining at least one of the set consisting of:
      a start-up order of network elements, and
      an order of activating communication channels allocated to the network modules;
   upon detection of a start-up error, deriving a new set of network variable settings from the recorded error data, by changing at least one of the start-up order of network elements and the order of activating communication channels allocated to the network modules; and
   restarting the network while using the new set of network variable settings.

14. The method according to claim 13, wherein the step of deriving a new set of network variable settings comprises a sub-step of changing an order of at least two elements of a network variable.

15. The method according to claim 13, wherein the step of deriving a new set of network variable settings comprises a sub-step of excluding at least one combination of network variable settings.

16. The method according to claim 13, wherein the step of deriving a new set of network variable settings comprises a sub-step of altering the values of network variables.

17. The method according to claim 13, wherein the step of deriving a new set of network variable settings comprises a sub-step of excluding error data associated with run-time errors.

18. The method according to claim 13, wherein the step of recording error data involves deriving error data from error messages.

19. The method according to claim 13, wherein the step of restarting involves limiting a number of restart attempts to a maximum number.

20. The method according to claim 13, wherein the step of restarting is carried out if the network modules fail to enter a desired state within a certain time duration.

21. The method according to claim 13, wherein the network modules are wireless modules, the network variable settings comprising at least one of the set of network variables including: network addresses and communication channel numbers.

22. The method according to claim 13, further comprising:
   comparing recorded error data for a plurality of start up errors,
   determining parts of the network parameters that are common to the recorded error data for several start up errors; and
   changing said parts to derive the new set of network variables.

23. A non-transitory computer-readable medium comprising computer-executable instructions for restarting a network comprising network modules, the computer-executable instructions, when executed by a processor, carry out the steps of:
   recording error data associated with errors occurring in the network, the error data comprising sets of network variable settings applying when the respective errors occurred, the network variables defining at least one of the set consisting of:
      a start-up order of network elements, and
      an order of activating communication channels allocated to the network modules;
   upon detection of a start-up error, deriving a new set of network variable settings from the recorded error data, by changing at least one of the start-up order of network elements and the order of activating communication channels allocated to the network modules; and
   restarting the network while using the new set of network variable settings.

* * * * *